United States Patent [19]
Kennie et al.

[11] Patent Number: 6,041,278
[45] Date of Patent: Mar. 21, 2000

[54] METHOD OF TRIGGERING A DETERMINATION OF THE COMPOSITION OF FUEL IN A FLEXIBLE FUELED VEHICLE

[75] Inventors: Jerry Kennie, Canton; Yi Cheng, Jackson; Mark E. Hope; Shean Huff, both of Ann Arbor; Robert J. Nankee, II, Canton; Mary Joyce, Farmington Hills; Dennis A. Krozek, Novi; Richard K. Moote, Ann Arbor; Roland T. Richardson, Detroit; William D. Rotramel, Plymouth; Gary L. Seitz, Chelsea, all of Mich.

[73] Assignee: Chrysler Corporation, Auburn Hills, Mich.

[21] Appl. No.: 08/958,403

[22] Filed: Oct. 29, 1997

[51] Int. Cl.$^7$ ................................................. G01M 15/00
[52] U.S. Cl. ............................. 701/103; 73/116; 73/117.3
[58] Field of Search .................... 73/116, 117.2, 73/117.3, 118.1, 119 A, 23.31, 23.32; 701/102, 103, 104

[56] References Cited

U.S. PATENT DOCUMENTS

| | | | |
|---|---|---|---|
| 4,942,848 | 7/1990 | Terasaka | 73/117.3 |
| 5,007,398 | 4/1991 | Kashiwabara | 73/117.3 |
| 5,119,671 | 6/1992 | Kopera | 73/116 |
| 5,150,683 | 9/1992 | Depa et al. | 73/116 |
| 5,255,661 | 10/1993 | Nankee, II et al. | 123/674 |
| 5,335,637 | 8/1994 | Davis et al. | 123/478 |
| 5,365,917 | 11/1994 | Adams et al. | 123/491 |
| 5,400,758 | 3/1995 | Rader et al. | 123/494 |
| 5,400,762 | 3/1995 | Fodale et al. | 123/674 |
| 5,415,145 | 5/1995 | Letcher et al. | 123/491 |
| 5,435,285 | 7/1995 | Adams et al. | 123/492 |
| 5,467,755 | 11/1995 | Konrad et al. | 123/674 |
| 5,497,753 | 3/1996 | Kopera | 123/494 |
| 5,520,162 | 5/1996 | Rotramel et al. | 123/689 |
| 5,582,157 | 12/1996 | Uchikawa | 73/116 |

*Primary Examiner*—George Dombroske
*Attorney, Agent, or Firm*—Mark P. Calcaterra

[57] ABSTRACT

A method is provided for triggering a system for learning the percent alcohol content of a fuel used in a motor vehicle capable of operating on more than one type of fuel. The fuel composition learning system is triggered each time fuel is added to the vehicle's fuel tank, each time the engine is started when the fuel volume in the fuel tank falls below a given value or if a fuel level sending unit malfunction has been detected. The fuel composition learning system is also triggered if an error is detected in the value of the learned percent alcohol content of the fuel.

5 Claims, 1 Drawing Sheet

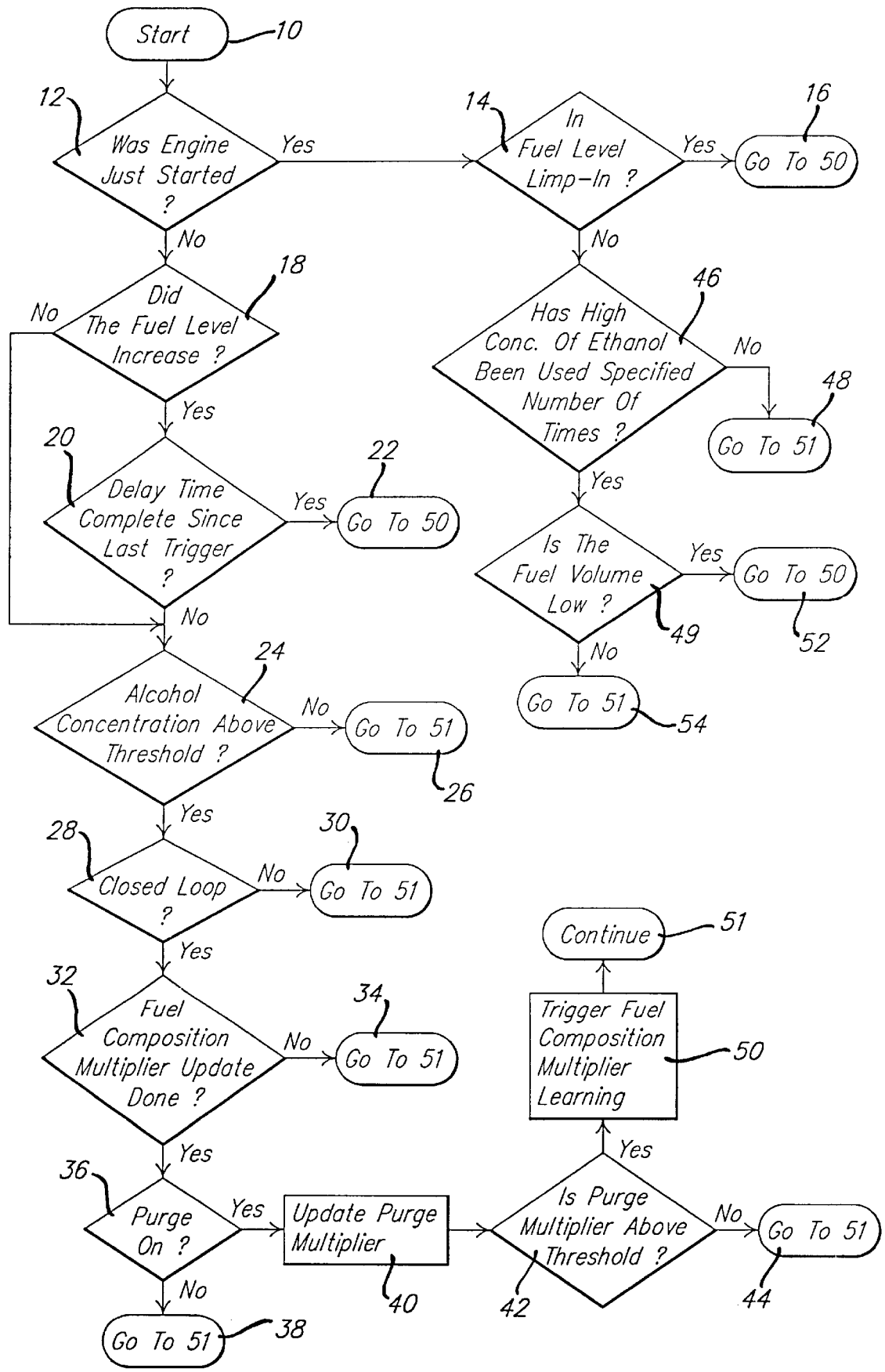

METHOD OF TRIGGERING A DETERMINATION OF THE COMPOSITION OF FUEL IN A FLEXIBLE FUELED VEHICLE

BACKGROUND OF THE INVENTION

1. Technical Field

The present invention relates generally to fuel control systems and, more particularly, to a method for triggering the determination of the percent alcohol content of the fuel used in a motor vehicle capable of operating on more than one type of fuel.

2. Discussion

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is therefore in demand. Modifications to the engine are necessary when operating on different fuels because of the different characteristics of each fuel. For example, an engine operating on ethanol or E85 (a blend of 85% ethanol and 15% gasoline) requires approximately 1.4 times the amount of fuel relative to gasoline at stoichiometry due to a lower energy content of the ethanol.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being burned in proportion to the amount of air to achieve perfect combustion. Likewise, if the air/fuel ratio is greater than stoichiometric, an engine is said to be operating lean, i.e., too much air is being burned in proportion to the amount of fuel to achieve perfect combustion. Alcohol fuels have a lower air/fuel ratio than gasoline at stoichiometric, so that the engine must be compensated for in the rich direction as the percentage of alcohol in the fuel increases.

In a returnless fuel system, the only time that the concentration of alcohol in the fuel tank changes is when fuel is added to the fuel tank of the flexible fuel vehicle. Therefore, the alcohol concentration only needs to be learned after fuel has been added to the fuel tank or when an error is discovered in the learned value. Previously, there was no way to detect when a possible alcohol concentration change was about to occur. Without proactive triggers, the alcohol learning relied on the ability of the methodology to react properly to an alcohol concentration change. However, continuously monitoring the potentially changing alcohol concentration interferes with normal vehicle operation. Furthermore, proactive triggers make it less likely that an alcohol concentration change could go undetected.

Therefore, it would be desirable to provide a methodology for limiting alcohol content learning to a short period of time following a fuel addition to reduce the impact that the learning has on normal vehicle operation and to relearn alcohol content if an error is detected.

SUMMARY OF THE INVENTION

It is, therefore, one object of the present invention to provide a system of flexible fuel compensation including means for detecting a fuel addition and triggering alcohol learning.

It is another object of the present invention to provide a flexible fuel compensation system including means for triggering alcohol learning when the fuel level is below a readable level.

It is yet another object of the present invention to provide a flexible fuel compensation system including means for triggering alcohol learning based on an error associated with a previously learned alcohol content value.

It is still another object of the present invention to provide a flexible fuel compensation system including means for triggering alcohol learning when a fuel level sending unit of the flexible fueled vehicle malfunctions and cannot indicate a fuel addition.

The above and other objects are provided by a flexible fuel compensation system for an internal combustion engine. The flexible fuel compensation system includes a method for triggering the learning of the percent alcohol content of a fuel used in a motor vehicle capable of operating on more than one type of fuel. The fuel composition learning system is triggered if any one of a set of fuel parameters indicative of certain characteristics of the fuel in the flexible fueled vehicle differs from known criteria by a preselected amount. The set of fuel parameters may include indicia of a volumetric state of the fuel or may include indicia of a composition of the fuel. For example, the fuel composition learning system is triggered each time fuel is added to the vehicle's fuel tank, and each time the engine is started if the fuel volume in the fuel tank falls below a given value or if a fuel level sending unit malfunction has been detected. Furthermore, the fuel composition learning system is triggered if an error is detected in the percent alcohol content value of the fuel.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a flow chart of a method for triggering a fuel composition learning system for a flexible fuel compensation control system for a flexible fueled vehicle.

DETAILED DESCRIPTION OF THE PREFERRED EMBODIMENTS

The present invention is directed towards a method for triggering a fuel composition learning system for a flexible fuel compensation control system for a flexible fueled vehicle. According to the present invention, a proactive trigger is provided for initiating percent alcohol content learning through a fuel composition learning system such as that disclosed in commonly assigned U.S. Pat. No. 5,881, 703 entitled "Method of Determining the Composition of Fuel in a Flexible Vehicle" by Nankee II et al. which is hereby expressly incorporated by reference herein. Due to the triggering system of the present invention, the duration that the vehicle's fuel vapor management purge mechanisms and on board diagnostic monitors must be disabled is limited and the period that normal gasoline operation is interrupted by repeatedly adding gasoline to the fuel tank is reduced. Furthermore, errors in the learned alcohol content of the fuel may be corrected.

In general, the method of the present invention triggers the fuel composition system (i.e., percent alcohol learning) in four circumstances: a normal fuel fill situation; a low fuel volume situation; a learned value error situation; and a fuel level sending unit malfunction situation. The normal fuel fill trigger is based on the assumption that the ethanol content typically only needs to be determined once per fuel addition and is held at that determined value until the next fuel addition. A fuel addition is determined by monitoring the fuel volume and detecting a significant change in the volume which would indicate that fuel has been added.

To accomplish this, the current fuel volume is recorded each time the vehicle comes to a stop since a fill could occur any time the vehicle is stopped. This recorded volume is compared to the present volume on a continuous basis. If the difference between the fuel volume recorded when the vehicle came to a stop and the present fuel volume is greater than a preselected threshold, the fuel composition learning system is started.

The separate low-volume trigger is provided since it is difficult to register small additions of fuel when the fuel tank is nearly empty. Also, a small addition can drastically change the fuel concentration with a nearly empty tank. Therefore, if the vehicle has a history of using high concentrations of ethanol in the fuel, the fuel composition learning system is started each time the engine is started when the fuel level is below a calibratable value. It should be noted that this feature assumes that the vehicle will only be filled with the engine off.

With respect to the learned value error trigger, flexible fuel concentration control systems in which the present invention may be employed commonly use a long-term fuel adaptive value to compensate for fuel vapors that might be ingested into the engine once the ethanol content of the fuel is determined and the vehicle's fuel vapor management system is enabled. The fuel composition learning system assumes that the ethanol content is incorrectly determined if the long-term fuel adaptive value indicates that an increase in the fuel being delivered is required. This is because the fuel vapors can only cause less fuel to be needed under all operating conditions. As such, a correction means for the fuel composition learning system is triggered if the long-term fuel adaptive value requires an increase in the fuel being delivered above a given threshold. It should be noted that the correction means is only triggered one time between consecutive fuel additions.

The fuel level sending unit malfunction trigger is provided since changes in the fuel level cannot be used to determine if a fuel fill has occurred when the fuel level sending unit has malfunctioned. In this case, the fuel composition system assumes that the vehicle could be filled any time that the vehicle is shut down. Therefore, the fuel composition learning system is started each time the engine is started as long as the malfunction condition exists.

Referring now to the drawing figures, FIG. 1 is a flow chart illustrating a method of triggering a fuel composition learning system for a flexible fuel compensation control system of a motor vehicle. The fuel composition learning system and the triggering method of the present invention are preferably accomplished in an engine control unit or microprocessor of the motor vehicle. The methodology starts in bubble 10 and advances to decision block 12. In decision block 12, the methodology determines whether the vehicle engine has just been started. If so, the methodology advances to decision block 14 to determine if a malfunction in the fuel level sending unit exists. This is referred to in the art as a "limp-in" condition. If the fuel level sending unit is malfunctioning, the methodology advances to bubble 16 where it is forwarded to block 50 and triggers the fuel composition learning system.

In decision block 12, if the motor vehicle engine has not just been started, the methodology advances to decision block 18 to determine whether the fuel level has increased more than a preselected amount such as more than 10%. If so, the methodology advances to block 20 and determines if enough time has expired to ensure that the same fuel fill is not causing multiple triggers. If the delay timer is complete at decision block 20, the methodology advances to bubble 22 where it is forwarded to block 50 and triggers the fuel composition learning system. It should be noted that the methodology continuously monitors the fuel level in the fuel system so that an increase in the fuel can be immediately detected. As such, the methodology not only flows through the decision block 20 as illustrated, but also constantly monitors the fuel level and may jump to block 20 to proceed through the remainder of the flow chart as soon as an increase in the fuel is detected.

If the fuel level did not increase at decision block 18, or if the delay timer is not complete at decision block 20, the methodology advances to decision block 24 and determines if the alcohol concentration in the fuel is above a given threshold. If not, the methodology advances to bubble 26 where it is forwarded to bubble 51 which returns the methodology to bubble 10. If the alcohol concentration level is above the given threshold in decision block 24, the methodology advances to decision block 28 and determines if the engine's fuel control system is operating in a closed loop mode. If not, the methodology advances to bubble 30 where it is advanced to bubble 51 and returned to bubble 10. The concentration level threshold is preferably about 30% ethanol. Also, for the purpose of this disclosure, a closed loop mode refers to that state of engine operation wherein fuel concentration determinations are being made based on an accurate, operational oxygen sensor as fully described in the aforementioned commonly assigned U.S. Pat. No. 5,881,703.

If the engine's fuel control system is operating in a closed loop mode at decision block 28, the methodology advances to decision block 32 to determine if the normal update of the fuel composition learning system (block 50) has been complete. If not, the methodology advances to bubble 34 where it is forwarded to bubble 51 and returned through bubble 10. If the fuel composition learning system has been updated, the methodology advances from decision block 32 to decision block 36 to determine if the motor vehicle's fuel vapor management system is operating. If not, the methodology advances from decision block 36 to bubble 38 where it is forwarded to bubble 51 and returned to bubble 10. If the fuel vapor management system is enabled, the methodology advances from decision block 36 to block 40 and updates a fuel vapor purge multiplier. The fuel vapor purge multiplier modifies the amount of fuel delivered to the engine to compensate for the fuel vapors ingested from the fuel vapor management system into the engine.

After the purge multiplier has been updated at block 40, the methodology advances to decision block 42 to determine if the purge multiplier value is greater than a given threshold. If fuel vapors are being ingested from the fuel vapor management system into the engine, the purge multiplier should always decrease the amount of fuel delivered. Therefore, if the purge multiplier calls for an increase in the fuel delivered, the learned alcohol concentration must be incorrect and lower than the true concentration. The threshold is indicative of the maximum amount of error desired between the incorrect learned alcohol concentration value and the true alcohol concentration value. Therefore, if the purge multiplier value is not greater than the threshold, the methodology advances to bubble 44 and is forwarded to bubble 51 and returned to bubble 10. However, if the purge multiplier value is greater than the threshold at decision block 42, the methodology advances to block 50 and triggers the fuel composition learning system.

Referring again to decision block 14, if the fuel level sending unit is functioning properly, the methodology advances to decision block 46 and determines if a fuel having a high concentration of ethanol has been used in the past at least a specific number of times. If not, the methodology advances to bubble 48 where it is forwarded to bubble 51 and returned to bubble 10. However, if a fuel having a high concentration of ethanol has been used at least a specific number of times at decision block 46, the methodology advances to decision block 49 and determines if the fuel volume is below a predetermined level. This level corresponds to a lower limit such as 5% full which is monitored so that small additions of fuel do not go unaccounted for. If the fuel level is below the predetermined level, the methodology advances to bubble 52 where it is advanced to block 50 and triggers the fuel composition learning system. If the fuel volume is not below the predetermined level at decision block 49, the methodology advances to bubble 54 where it is forwarded to bubble 51 and returned to bubble 10.

In block 50, the fuel composition learning system is triggered. This fuel composition learning system can be any of a number of systems but is preferably an oxygen sensor based system such as that disclosed in the above-referenced patent application U.S. Pat. No. 5,881,703. Whether this type of system is employed or not, the present invention tests for certain criteria to exist and triggers fuel composition learning accordingly.

Thus, the present invention provides means for triggering a fuel composition learning system in a flexible fueled vehicle. The present invention triggers the fuel composition learning system after a normal fuel tank fill-up, when the fuel volume falls below a certain level, when there appears to be an error in the learned percent alcohol content value, and when the fuel level sending unit malfunctions. As such, the fuel composition does not need to be continuously monitored, small additions of fuel can be registered even when the tank is nearly empty, errors in the fuel multiplier can be corrected, and fuel composition can be determined if a fuel tank fill-up goes undetected.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of triggering a fuel composition learning system in a flexible fueled vehicle comprising:

detecting a group of fuel parameters, said group consisting of additional fuel added to a tank of said vehicle, a fuel level in said tank dropping below a predetermined level, a failure of a fuel level sensor, and an indicia of a composition of said fuel;

testing a detected value of one of said group of fuel parameters against known threshold criteria; and triggering said fuel composition learning system if said detected value of said one of said group differs from said threshold criteria by a preselected amount.

2. The method of claim 1 wherein said indicia of said composition of said fuel further comprises a percent alcohol content of said fuel.

3. A method of triggering a fuel composition learning system in a flexible fueled vehicle comprising:

detecting when a level of fuel in a tank of said vehicle is below a predetermined level;

determining if a fuel having a high concentration of alcohol therein has existed in said tank a specified number of times before said level of fuel went below said predetermined level; and triggering said fuel composition learning system on a subsequent engine start.

4. A method of triggering a fuel composition learning system in a flexible fueled vehicle comprising:

determining when a fuel level sending unit is malfunctioning; and triggering said fuel composition learning system on a subsequent engine start.

5. A method of triggering a fuel composition learning system in a flexible fueled vehicle comprising:

determining if an alcohol concentration in a fuel in a fuel system of said flexible fueled vehicle is above a given threshold;

determining if a fuel control system of said vehicle is operating in a closed loop mode;

determining if said fuel composition learning system has been previously updated;

determining if a fuel vapor management system of said flexible fueled vehicle is operating;

updating a fuel vapor purge multiplier of said fuel vapor management system; and triggering said fuel composition learning system if said fuel vapor purge multiplier exceeds a preselected threshold.

* * * * *